United States Patent [19]
Shimandle

[11] Patent Number: 5,185,108
[45] Date of Patent: Feb. 9, 1993

[54] METHOD FOR PRODUCING WAX MICROSPHERES

[75] Inventor: Donald J. Shimandle, Streetsboro, Ohio

[73] Assignee: The B. F. Goodrich Company, Brecksville, Ohio

[21] Appl. No.: 727,746

[22] Filed: Jul. 10, 1991

[51] Int. Cl.$^5$ .............................................. B29B 9/10
[52] U.S. Cl. ....................................... 264/11; 264/14
[58] Field of Search ................ 264/14, 13, 11; 425/6, 425/7, 10

[56] References Cited

U.S. PATENT DOCUMENTS

| | | | |
|---|---|---|---|
| 2,570,423 | 3/1948 | Batchelder | 425/10 |
| 3,042,970 | 7/1962 | Terenzi | 264/14 |
| 3,600,478 | 8/1971 | Kars | 264/13 |
| 3,868,199 | 2/1975 | Fera | 425/10 |
| 4,013,744 | 3/1977 | Kuerten et al. | 264/11 |
| 4,071,443 | 1/1978 | Gorski et al. | 210/604 |
| 4,219,512 | 8/1980 | Sinn et al. | 264/11 |
| 4,384,835 | 5/1983 | Bland | 425/10 |
| 4,778,835 | 10/1988 | Sittel et al. | 523/315 |
| 4,846,887 | 7/1989 | Kuehnle | 106/31 |
| 4,863,538 | 9/1989 | Deckard | 156/62.2 |
| 4,898,486 | 2/1990 | Mecke et al. | 400/241.2 |
| 4,919,853 | 4/1990 | Alvarez et al. | 264/12 |
| 4,938,816 | 7/1990 | Beaman et al. | 264/22 |
| 4,944,817 | 7/1990 | Bourell | 156/62.2 |

FOREIGN PATENT DOCUMENTS

| | | | |
|---|---|---|---|
| 1157202 | 11/1963 | Fed. Rep. of Germany | 264/14 |
| 3024292 | 1/1982 | Fed. Rep. of Germany | 264/14 |

*Primary Examiner*—Mary Lynn Theisen
*Attorney, Agent, or Firm*—Alfred D. Lobo; Nestor W. Shust

[57] ABSTRACT

A process is disclosed for producing wax microspheres from molten wax. Hot water or other motive liquid in which molten wax is immiscible, is flowed under pressure through an orifice zone into which the molten wax is drawn to form a dispersion of molten wax. The dispersion is discharged into a liquid in which the wax is also immiscible, so that the wax solidifies. The liquid is maintained at a controlled temperature below the melting point of the wax. Essentially spherical wax microspheres are formed in the size range from $1\mu$ to about $350\mu$ in a two-tier weight distribution. A mass of these wax microspheres are recovered from the surface of the liquid, and dried to yield a mass of free-flowing individual wax microspheres which are used to produce a sintered porous body having a void fraction in the range from about 0.1 to 0.5. Enough smaller microspheres are lodged in the interstitial spaces between larger microspheres, resulting in a densified powder; the densified powder, in turn, when sintered, is further "autogenously" densified, forming a denser sintered body than is formed with wax powder of uniform microspheres of either the larger size only, or the smaller size only, when either of such uniform sizes are sintered by the requisite amount of laser energy.

7 Claims, 5 Drawing Sheets

METHOD FOR PRODUCING WAX MICROSPHERES

BACKGROUND OF THE INVENTION

Powdered wax, or paraffin powder, is used in commerce in large amounts for a host of different applications some of which require that the particles of wax be solid, essentially spherical and in the size range from about 1 $\mu$ (micron) to about 177 $\mu$ or even larger. The term "wax" as used herein refers not only to paraffin waxes but to wax-like materials which have the physical characteristics of paraffin wax and are used in generally analogous applications. By "essentially spherical" we mean that there is less than 1% deviation between any two axes detectable under a magnification of 75× (seventy five times).

For example large wax beads in the range from about 1 mm to about 15 mm are not essentially spherical, and do not need to be because they are typically used in decorative applications, particularly for "bead curtains" and in mock-ups of jewelry featuring pearls and beads of amber, amethyst, jade, etc. of different colors and sizes. Relatively smaller wax beads, over a wide range of sizes from 44 $\mu$ to about 1 mm may be injection molded into a desired shape to be used as a pattern from which a shell mold is to be made for an investment casting. A few applications, such as for printing inks and varnish compositions, require a narrower size range of particles in the range from about 1 $\mu$ to about 44 $\mu$, more preferably limited to a range of less than about 20 $\mu$, but with no specific regard for sphericity. This is also true in those instances where finely divided solid wax particles are used as inert fillers in tablets of pharmaceuticals.

In neither of the prior art applications is there an emphasis on sphericity because there is no special need for such a property. If the particles made were essentially spherical it was not because sphericity was particularly sought. For the particular purpose to which the invention is directed, namely, forming a sintered body as described below, it is essential that individual wax particles be essentially spherical so that the force required to roll a first mass of particles over another is minimal, and it is a particular characteristic of the claimed process that the microspheres made in a two-tier weight distribution described below, are essentially spherical. An added benefit of having essentially spherical microspheres in the twotier weight distribution is that it provides the sintered body with better surface definition.

U.S. Pat. No. 4,898,486 to Meck et al (class 400/subclass 241.2) describes the use of powdered wax in a melt-transfer color layer for a thermal printing head, e.g. of the dot-matrix type. U.S. Pat. No. 4,846,887 to Kuehnle (class 106/subclass 31) teaches a process for making micronized wax by spraying a wax melt to obtain a powder of spherical particles, then grinding the powder.

Depending upon the size of the wax spheres desired, many different methods have been used to make them. For example, a wax melt is sprayed into water through one or more nozzles so as to produce a liquid stream of wax which is broken up, one way or another, into a multiplicity of droplets. To obtain relatively large wax spheres the melt may be introduced under pressure, into a temperature-controlled water bath, either downwardly as in U.S. Pat. No. 2,570,423 to Batchelder et al, or, upwardly as in U.S. Pat. No. 4,384,835 to Bland (both in class 425/subclass 10).

Instead of spraying the molten wax into water or other liquid in which the wax is immiscible, molten wax under pressure is sprayed into air through a nozzle, either upwardly or downwardly. These methods of spraying molten wax into a gas stream generally produce smaller wax spheres than methods in which the molten wax is sprayed onto or into a liquid. For example, wax spheres in the range from about 18 $\mu$ to about 80 $\mu$ are formed by spraying upwardly into a controlled high-velocity stream of cold air, as more fully described in U.S. Pat. No. 3,868,199 (class 425/subclass 10) to Fera. The spheres formed are graded into four groups, namely, those over 80 $\mu$, those under 18 $\mu$, those between 45 $\mu$–90 $\mu$, and those between 18 $\mu$–45$\mu$. Thus, under any conditions, more than half the spheres by weight (wt), are always smaller than 18 $\mu$; less than 5% by wt are over 80 $\mu$. It is evident that the foregoing particular distribution of sizes is of wax spheres which are small (hence referred to as "microspheres") and were tailored to find specific use in applications which demanded the particular size distribution Fera made. In most cases, as in his, it is the specific proposed purpose for which the microspheres are to be used which determines the size ranges in which they are to be made. Whatever his purpose, it is evident he did not teach making and using microspheres having a size distribution such that more than half (>50%) the cumulative weight percent is attributable to particles having a diameter greater than a predetermined diameter (175 $\mu$, in particular). This distribution of wax microspheres by our process is referred to as a "two-tier weight distribution".

A particular distribution of sizes of wax microspheres is of especial interest, and in particular demand for a method to produce a shaped article by a selective laser sintering (SLS) process disclosed in U.S. Pat. Nos. 4,863,538 to Deckard; 4,938,816 to Beaman et al; and, 4,944,817 to Bourell et al, the disclosure of each of which is incorporated by reference thereto as if fully set forth herein. The shaped article is formed by sintering a powder of one or more materials. "Sintering" is defined by the heating of the powder to a temperature which causes viscous flow only at contiguous boundaries of its particles, with at least some portion of substantially all particles remaining solid. Such sintering causes coalescence of particles into a sintered solid mass, the density of which is increased compared to the bulk density of the powder particles before they were sintered; and, a part formed by layer-wise joining of plural vertically contiguous layers is therefore said to be autogenously densified.

The goal of the SLS process using a wax powder as the feed material, is to produce a solid porous article from the powder, which article not only has the precise dimensions of the shape desired, but is dense enough to provide a pattern from which a shell mold is to be made. The denser (that is, less porous and smaller void fraction) the article, the stronger it is, hence the denser the better. It is essential that the wax powder feed be readily flowable and easily pourable at an elevated temperature below the initial melting point of the wax, under applied force only sufficient to spread the powder over a target area in a SLS machine in which the SLS process is practiced. To provide the wax powder with such fluidity, shapes other than essentially spherical, are inadequate and ineffective for the purpose at hand.

To our knowledge, there has never been a need for a two-tier weight distribution of wax particles produced by a process which directly generated a mass of microspheres such that more than half (>50%) the cumulative weight percent is attributable to particles having a diameter greater than a predetermined diameter (175 $\mu$ is most preferred for the task at hand) for the particular purpose of packing at least some, and preferably a major portion of the interstitial spaces between the larger particles with the smaller ones. Therefore there has been no motivation for one to address such a specific problem.

For the reason given, we did, and in a very simple process, directly produced not only the desired size range of wax microspheres by a novel process, but produced them in a desirable, substantially two-tier weight distribution of sizes. When the process is used to generate microspheres essentially none which are smaller than about 125 $\mu$ the process does not meet the requirements of the specific SLS purpose for which the microspheres are to be used. Moreover, such smaller particles are formed in too narrow a size range, as will be evident from the data presented as a graph in FIG. 7.

Because the SLS process determines the size range and wax microspheres, a brief description of the SLS process follows.

The SLS process is carried out in an apparatus which includes a laser or other directed energy source which is selected and tailored to emit a beam of desired intensity in a target area where a three-dimensional wax part is produced. A powder dispenser system deposits powder into the target area. A laser control mechanism operates to move the aim of the laser beam and modulates the laser to selectively sinter only the wax powder disposed within defined boundaries to produce a two-dimensional portion (layer) of the part. The control mechanism operates selectively to sinter sequential layers of powder each within the defined boundaries, producing a completed part comprising a plurality of layers sintered together. The defined boundaries of each layer correspond to respective cross-sectional regions of the part. Preferably, the control mechanism includes a computer—e.g. a CAD/CAM system to determine the defined boundaries for each layer. That is, given the overall dimensions and configuration of the part, the computer determines the defined boundaries for each layer and operates the laser control mechanism in accordance with the defined boundaries for each layer. Alternatively, the computer can be initially programmed with the defined boundaries for each layer.

A part is produced by depositing a first portion of powder onto a target surface, scanning the aim of a directed energy beam (preferably a laser) over the target surface, and sintering a first layer of the first powder portion on the target surface. The first layer corresponds to a first cross-sectional region of the part. The powder is sintered by operating the directed energy source when the aim of the beam is within the boundaries defining the first layers. A second portion of powder is deposited onto the first sintered layer and the aim of the laser beam scanned over the first sintered layer. A second layer of the second powdered portion is sintered by operating the directed energy source when the aim of the beam is within the boundaries defining the second layer. Sintering of the second layer also joins the first and second layers into a cohesive mass. Successive portions of powder are deposited onto the previously sintered layers, each layer being sintered in turn.

Repetition of the foregoing steps results in the formation of a bed of powder which continually presents the target surface, and if the wax particles of powder are overheated by the beam at the boundaries of the article, the sharp definition of the boundaries is lost. It is therefore essential that the wax particles of powder outside the boundaries of the article to be formed, withstand being sintered and retain their individual particulate identities.

Considering that the sintered body is to be made as dense as possible without sacrificing the sharp definition of the boundaries of the article, we came to realize that the feed powder should be of relatively large wax microspheres (referred to as "large spheres"), and that the interstitial spaces between a mass of such spheres be filled with much smaller microspheres (referred to as "small spheres"). For example, knowing that spheres packed in cubic, body centered cubic and face centered cubic packing configurations have void fractions of 0.48, 0.32 and 0.26, respectively, one can estimate that randomly packing a unit volume with microspheres of identical diameter will result in a void fraction of about 0.33 (that is, leaves a 0.33 fraction of void space between and around the microspheres). Because there is a geometrical relationship between the diameter of a large microsphere and of a smaller one just large enough to fit in the interstitial spaces between packed large microspheres, we sought to produce a mass of microspheres which would be a very rough approximation of a mixture of spheres having basically only two ranges of diameters, each as narrow as possible, namely, a large diameter range for "large" spheres, and a smaller diameter range for "small" spheres.

Of course, one could produce precisely the correct mixture of sizes by producing a mass of wax spheres in a wide range of diameters, then sieving, or somehow painstakingly separating the spheres into various fractions, and mixing only the desired fractions. Except that it is impractical to separate microspheres smaller than about 25 $\mu$ with sieves. Moreover, only relatively large wax spheres, larger than about 44 $\mu$ lend themselves to sieving, the smaller sieves being soon "blinded" by very quickly. Further, though there are separation methods using differences in the velocity of wax spheres of different sizes falling through a liquid, such methods are impractical on a commercial scale. At the present time we know of no practical method for separating large wax microspheres in a range in which the average large diameter is greater than about 175 $\mu$, from small wax microspheres in which the average small diameter is less than one-half the average large diameter.

In practice, large spheres cannot be made within as narrow a range as one would desire, but only in a relatively broad range of diameters, so that the interstitial spaces between four contiguous spheres would not be the same, and neither would the diameter of the small microspheres required to fit in those interstitial spaces. But there was no reason to believe that one could not make "large" spheres within a relatively narrow range of diameters. Such "large" spheres would in turn, require "small" spheres (for the interstitial spaces) also within a relatively narrow range. Thus, it would be highly desirable to practice a process which would, for the most part, produce a product having a two-tier weight distribution.

We have discovered a novel and very simple process to produce a two-tier distribution of microspheres which when sintered, yield such a product.

SUMMARY OF THE INVENTION

A simple process has been discovered for producing wax microspheres from molten wax, comprising, flowing a confined stream of hot motive liquid, in which molten wax is immiscible, under pressure through an orifice zone into which molten wax is drawn to form a dispersion of molten wax; discharging the dispersion into a solidification liquid in which wax is also immiscible, the solidification liquid being maintained at a controlled temperature below the melting point of the wax; directly producing essentially spherical wax microspheres substantially all of which are in the size range from 1 $\mu$ to about 350 $\mu$, in a two-tier weight distribution; recovering a mass of wax microspheres from the surface of the solidification liquid; and, drying the mass to recover a free-flowing mass of individual wax microspheres.

It is therefore a general object of this invention to provide the simple process described hereinabove which can be practiced with a minimum of equipment and cost. The apparatus for practicing the process comprises, inlet conduit means for supplying a stream of motive liquid at a pressure in the range from about 300 kPa to about 2000 kPa, the molten wax being immiscible in the motive liquid; an eductor means having an orifice at least 10, and up to 100 times larger in diameter than that of an average wax microsphere to be produced; suction conduit means for introducing the molten wax into the eductor so that the wax enters in proximity to the orifice in the eductor; discharge conduit means through which a dispersion of wax microspheres in the motive liquid is discharged; and, reservoir means for containing a mass of solidification liquid in which the molten wax is also immiscible; the composition of the solidification liquid being the same as that of the motive liquid, or different, and the former maintained at a temperature below the initial melting point of the molten wax.

It has also been discovered that the simple process described hereinabove can be operated without the use of any solvent for the wax, using only a pressurized stream of hot water (motive liquid) flowing through an eductor into which the molten wax is drawn, so that the process is controlled to produce wax microspheres having an essentially two-tier weight distribution.

It is yet another specific object of this invention to produce a sintered porous body having a void fraction in the range from about 0.1 to 0.5, derived from wax powder in the form of microspheres present in a substantially two-tier weight distribution so that at least some of the "small spheres" are lodged in the interstitial spaces between "large spheres", resulting in a densified powder; the densified powder, in turn, when sintered, is further "autogenously" densified, so termed because of the particular densification which occurs as a result of the desired pre-distribution of small spheres within the voids left in the volume occupied by the large. The autogenously densified powder results in the formation of a denser sintered body than is formed with wax powder of uniform particles of either the larger size only, or the smaller size only, when either of such uniform sizes are sintered by the requisite amount of laser energy.

It is a specific object of this invention to provide a dense but porous sintered body of arbitrary shape and size and desirable surface uniformity, derived from a powder of a wax commonly used to form patterns for producing shell molds, the wax powder having an essentially two-tier weight distribution of sizes of the microspheres, the "large spheres" being in the size range above 175 $\mu$, and the "small spheres" being in the size range below 175 $\mu$.

It is a further specific object of this invention to provide an eductor means in which the orifice diameter may be varied to provide a desired two-tier weight distribution of size ranges of wax microspheres.

BRIEF DESCRIPTION OF THE DRAWING

The foregoing and additional objects and advantages of the invention will best be understood by reference to the following detailed description, accompanied with a schematic illustration of preferred embodiments of the invention, in which.

DETAILED DESCRIPTION OF PREFERRED EMBODIMENTS OF THE INVENTION

The wax materials which may be used to make wax microspheres include paraffins, silicones, natural waxes such as carnauba wax, beeswax, ozocerite and paraffin wax, synthetic waxes such as acid waxes, ester waxes, partly saponified ester waxes, polyethylene waxes, as well as polyglycols. Most preferred waxes are the polyethylene and ester waxes, and those derived from montan wax, all of which melt over a relatively wide range of temperature in the range from 3° C. to about 20° C.; that is, instead of melting sharply, the initial melting point is in the range from 3° C. to about 20° C. lower than the final melting point. Preferred waxes are those having an initial melting point in the range from about 50° C. to about 175° C.

Figure 1:
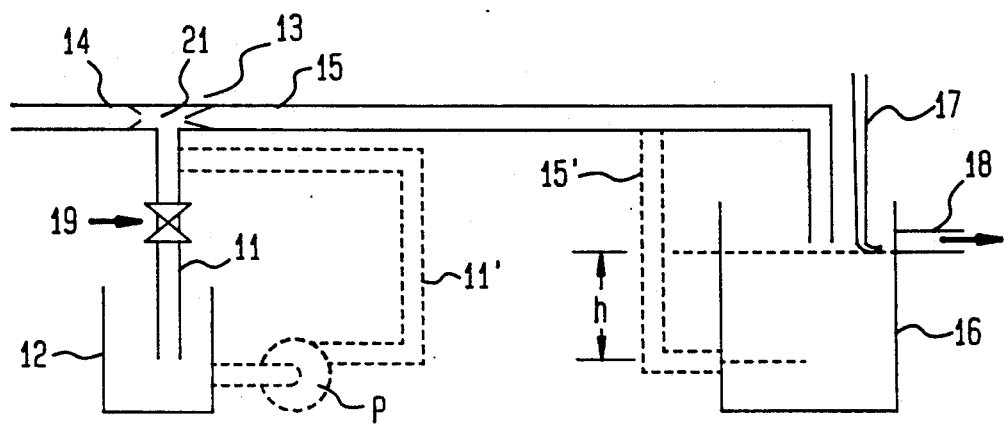
FIG. 1 is a schematic illustration of one preferred embodiment of the equipment used to practice the process, the dotted lines indicating in phantom outline, the position of the discharge conduit which discharges the dispersion of molten wax and water under the surface of the reservoir.

Referring to FIG. 1 there is illustrated an apparatus for the supply of molten wax through suction conduit 11 from a wax reservoir 12. Enough motive fluid, preferably hot water under pressure, is flowed through inlet conduit 14 to lift wax by suction into eductor 13. The eductor is also referred to as an injector or nozzle, but will be referred to herein as an eductor because, in the best mode, it serves to lift molten wax into close proximity to the orifice 21 (see FIG. 2); and the term "nozzle" will be used to refer (more correctly) to a particular portion of the eductor. In an alternative embodiment, the molten wax may be pumped from the reservoir by a pump P (shown in phantom outline) which delivers the desired volume per minute of wax through discharge line 11' to the eductor at a predetermined pressure. The eductor 13 is connected on one side with the inlet conduit 14, the eductor preferably being in open communication with the reservoir 12 or other source of molten wax, and on the other side, the eductor is coaxially connected with a discharge conduit 15. For operational flexibility, particularly when the composition of the molten wax or the pressure of the motive fluid is subject to change, it is desirable to have a valve 19 in the suction line 11 to control the flow of wax into the eductor.

The motive liquid, typically hot water in the best embodiment, is flowed under pressure through the inlet conduit 14. The flow of water is constricted at the orifice 21 within the eductor, and is discharged through axially aligned discharge conduit 15. The 'discharge head' is the height (in feet or centimeters) of the discharge outlet of the discharge conduit 15 above the orifice. As indicated, the discharge outlet of the discharge conduit 15 sprays a dispersion of wax in water onto the surface of the solidification liquid, preferably also water, in the tank 16.

In another embodiment, shown in phantom outline, the discharge conduit 15 is turned downward, and as conduit 15' enters the side of the tank 16, discharging under the surface of the liquid in the tank, against static head 'h' of the liquid.

In either embodiment, wax microspheres float to the surface of the liquid and are blown by an air jet 17 along the surface through an overflow outlet 18. The wet overflow of microspheres is thoroughly dried, typically by counter-current passage of hot air through the microspheres, and the dried wax microspheres directed over a sieve having a mesh size of 350 $\mu$, to remove agglomerates.

The diameter of the orifice 21 is at least 10 times the number average diameter of a microsphere in the upper range of the two-tier weight distribution produced. The particular diameters of microspheres in each of the ranges is determined by the viscosity and other physical characteristics of the molten wax, the orifice size, the motive liquid pressure and its viscosity and other physical characteristics, the rate of flow of the motive liquid, the suction lift or pressure of entering molten wax, the discharge head to be overcome by the discharge from the orifice, and the pressure exerted by the head of solidification liquid if the freshly formed wax microspheres are discharged under the surface of the solidification liquid. The desired ranges to be formed in the two-tier weight distribution can be arrived at with a little trial and error which one skilled in the art will likely find to be quicker than trying to make the demanding theoretical calculations required.

For example, if one required a two-tier weight distribution where more than half ($>50\%$) the cumulative weight percent is attributable to microspheres having a diameter greater than 125 $\mu$, one could change the orifice diameter, or the pressure of the motive fluid, or its flow rate, etc. The upper limit of the diameter sought to be made by our process is not clearly defined because the many variables which affect it. However, in a process where both the motive fluid and the solidification liquid are water, under most practical conditions using commercially available waxes, a two-tier weight distribution where more than half ($>50\%$) the cumulative weight percent is attributable to microspheres having a diameter greater than 250 $\mu$ may be made, with the upper limit of individual microspheres being about 500 $\mu$. As one might expect, with most combinations of variables, the smallest particles made may remain as small as 1 $\mu$.

Figure 2:
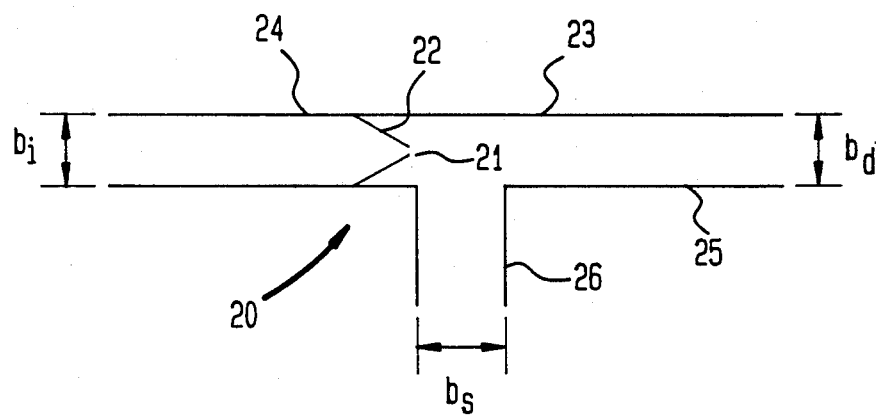
FIG. 2 is a detailed view of one embodiment of an eductor used to produce the dispersion of molten wax in water.

Referring now to FIG. 2 there is schematically illustrated a standard eductor 20 commercially available as the Fisher Airejector available from Fisher Scientific Co. (Catalog #09-956). The eductor comprises an integral orifice 21 and nozzle 22 in a housing 23. The housing 23 consists essentially of an inlet 24 having a bore $b_i$, and an axially aligned discharge 25 having a bore $b_d$. A suction intake 26 having a bore $b_s$ is in open communication with the discharge 25, and enters in proximity to the orifice 21, preferably slightly downstream thereof so that molten wax lifted through the suction intake 26 is drawn into a mixing zone created immediately downstream of the orifice. The pressure drop across the orifice causes the molten wax to be dispersed into microspheres of molten wax which cool as they flow out of the discharge 25 of the eductor 20. The material of construction for the eductor is preferably brass, or stainless steel but could also be a tough synthetic resin such as Delrin polyacetal, or a glass fiber reinforced (GFR) resin such as GFR poly(vinyl chloride).

Figure 3:
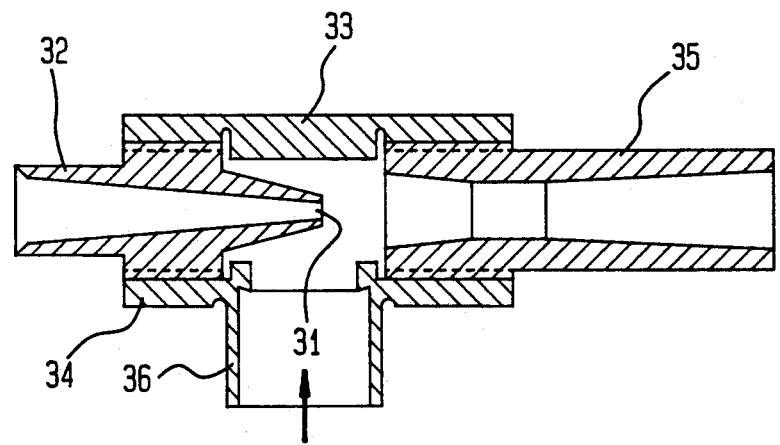
FIG. 3 is a detailed view of another embodiment of an eductor used to produce the dispersion of molten wax in water.

Referring now to FIG. 3 there is schematically illustrated another embodiment of an eductor 30 commercially available as the Pardee B-10 Series eductor which comprises a nozzle 32 threadedly secured in a housing 33. The nozzle 32 has an integral orifice 31 axially aligned with a diffuser 35. The housing 33 consists essentially of an inlet 34 having a bore $b_i$, and an axially aligned discharge 35 into which the diffuser having a venturi-shaped bore is threadedly secured. The upstream bore $b_u$ of the venturi-shaped bore is smaller than the downstream bore $b_d$. A suction intake 36 having a bore $b_s$ is in open communication with the discharge 35, and enters in proximity to the orifice 21, preferably slightly downstream thereof so that molten wax lifted through the suction intake 26 is drawn into a mixing zone created immediately downstream of the orifice and in the venturi-shaped bore of the diffuser 35. The turbulent fluid flow due to the pressure drop across the orifice causes the molten wax to be micronized.

Once a particular orifice diameter is chosen to provide a rough two-tier weight distribution, by changing the upstream and downstream bores $b_u$ and $b_d$ respectively, and also the bore of the suction intake $b_s$, mainly by trial and error, one can arrive at a desired two-tier weight distribution which is "fine-tuned".

The material of construction for the eductor is preferably stainless steel, if a metal is desired, and poly(vinyl chloride) ("PVC") or chlorinated poly(vinyl chloride) ("CPVC") if a resin is desired.

Figure 4:
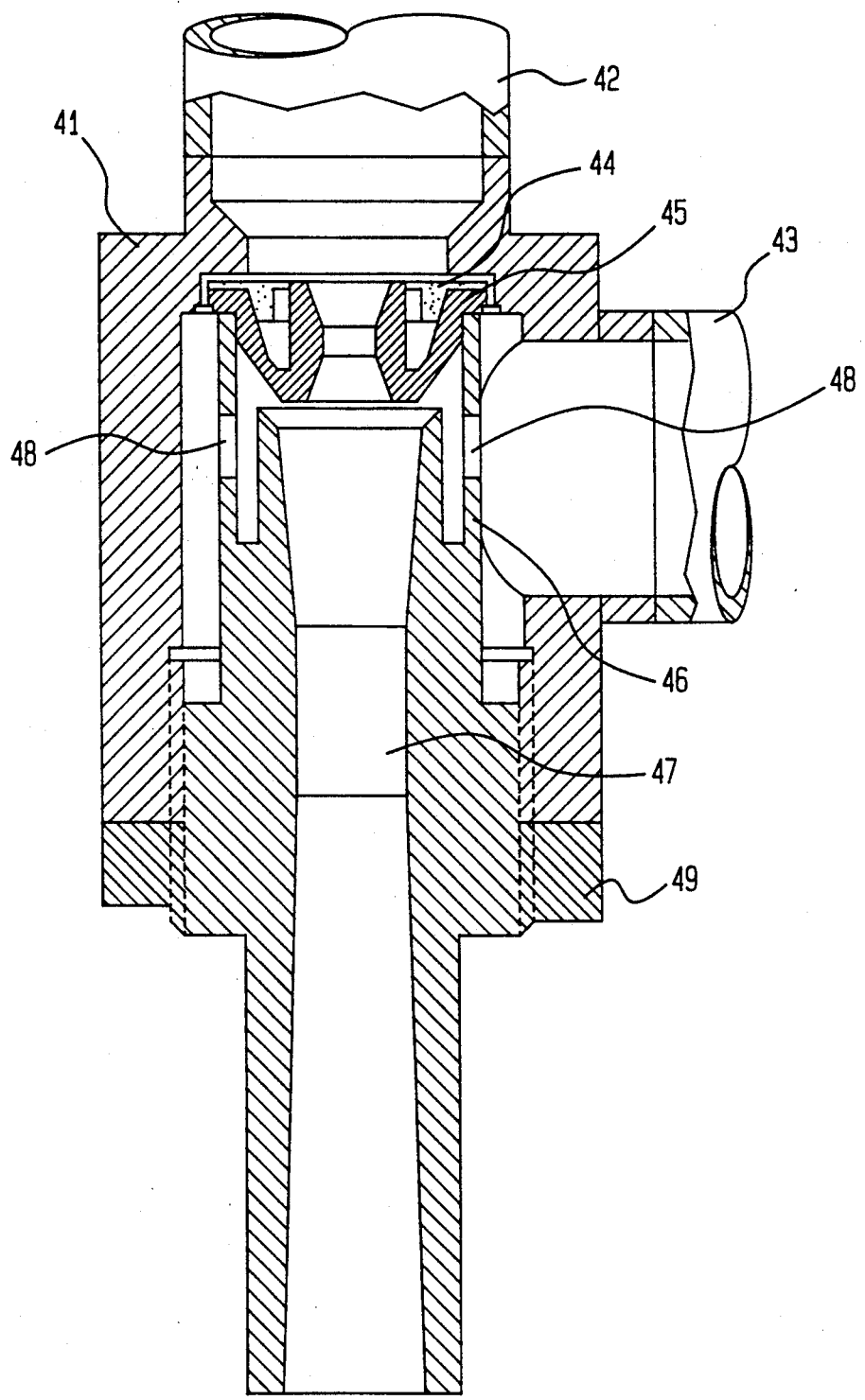
FIG. 4 is a detailed view of still another embodiment of an eductor used to produce the dispersion of molten wax in water.

Referring now to FIG. 4 there is schematically illustrated still another embodiment of an eductor 40 disclosed in U.S. Pat. No. 4,071,443 the disclosure of which eductor is incorporated by reference thereto as if fully set forth herein. The eductor comprises a housing 41 fixedly connected to an inlet conduit 42 for motive liquid, and a suction line 43 for molten wax, a seal 44 being inserted into the housing 41 at the opening of the inlet conduit 42. An insertable propelling nozzle 45 is guided against the seal 44. A jacket pipe 46 is fixedly connected to mixing nozzle 47 formed with bores 48 and designed to be threadedly secured in the housing 41, being arranged on the rim of the propelling nozzle 45. A locknut 49 at the end of the housing 41 secures the assembly. The eductor is preferably made of a plastic material, for example, chlorinated poly(vinyl chloride), nylon 11, rigid polyethylene or polypropylene.

The eductor system chosen will depend upon the mass of wax microspheres one wishes to produce from a single nozzle, how much "fine-tuning" one wishes to undertake, the frequency with which changes in the ranges of the two-tier distribution is to be made, and the cost of making such changes. Whichever eductor system is chosen, the amount of molten wax is controlled so that its flow to the orifice zone is such that the motive fluid provides the continuous phase, and the molten wax is the disperse phase.

The system is operated by connecting the inlet conduit 14 to a source of pressurized hot water at a temperature in the range from about 80° C. to about 120° C. and pressure sufficient to form a dispersion of the molten wax in the hot water, preferably in the range from about 500 kPa to about 1000 Kpa. Suction line 11 is placed in the molten wax reservoir 12 and the molten wax is lifted into the eductor 13 from which it is discharged onto the surface of water in the reservoir 16 maintained at a temperature in the range from about 30° C. to about 50° C.

The density of a mixture of "large" and "small" spheres cannot be predicted a priori if the two respective samples have distributions of sizes which are not well characterized. It is possible that mixing samples of large and small spheres will result in powder which has a density lower, higher, or between the densities of the original powders, depending upon the relative sizes and distributions. Characteristically, the bulk density of a two-tier weight distribution of microspheres made by our process is about 0.4 g/cc for the particular wax we have used in the illustrative examples.

Figure 5:
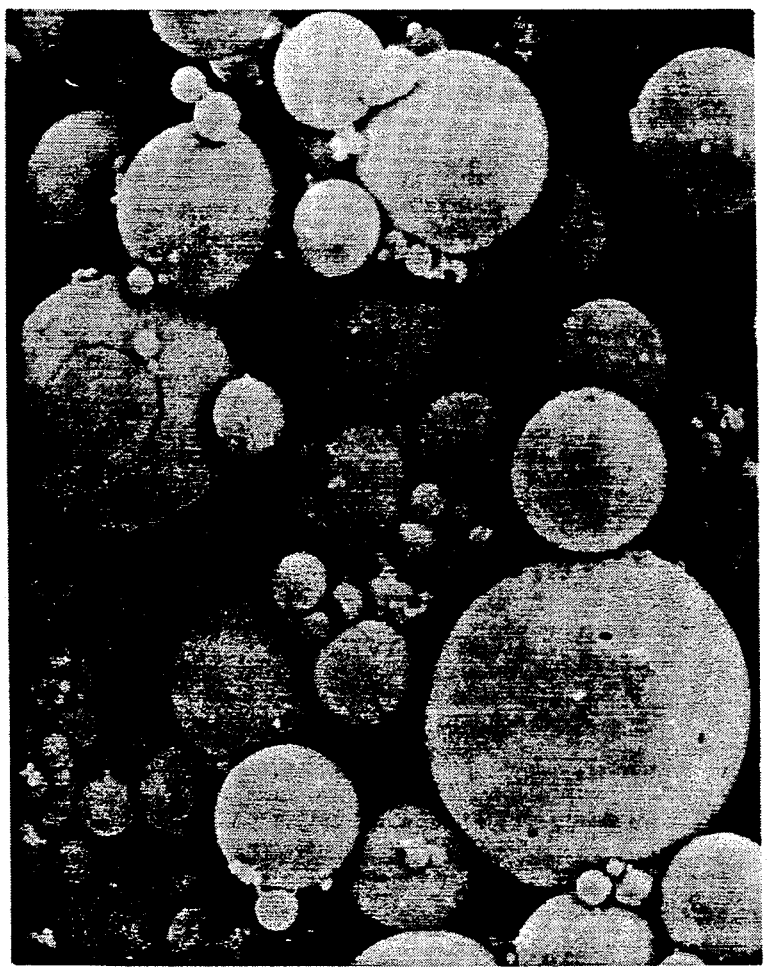
FIG. 5 is a photomicrograph at 75 × magnification of the microspheres recovered from a discharge using the process and apparatus of this invention.

Referring now to FIG. 5 there is shown a photomicrograph enlarged 75 times (75×) of a sample of product recovered from run No. 1 using the Fisher Airejector. Upon measuring the diameters of the microspheres and using the image analysis method to determine the sizes of individual spheres, it was found that the distribution of sizes of microspheres is as follows:

TABLE 1

| Diameter ($\mu$) | No. of particles | Percent |
|---|---|---|
| 19.8 | 39 | 7.00 |
| 27.2 | 55 | 9.87 |
| 34.5 | 71 | 12.74 |
| 41.9 | 82 | 14.72 |
| 48.3 | 35 | 6.28 |
| 56.7 | 31 | 5.56 |
| 64.0 | 26 | 4.66 |
| 71.3 | 20 | 3.59 |
| 78.7 | 14 | 2.51 |
| 86.1 | 25 | 4.48 |
| 93.5 | 19 | 3.41 |
| 101. | 16 | 2.87 |
| 108. | 12 | 2.15 |
| 123. | 8 | 1.43 |
| 130. | 6 | 1.07 |
| 138. | 4 | 0.72 |
| 145. | 8 | 1.43 |
| 152. | 6 | 1.07 |
| 160. | 5 | 0.90 |
| 167. | 7 | 1.25 |
| 174. | 9 | 1.61 |
| 181. | 6 | 1.07 |

TABLE 1-continued

| Diameter ($\mu$) | No. of particles | Percent |
|---|---|---|
| 189. | 2 | 0.36 |
| 196. | 6 | 1.07 |
| 203. | 9 | 1.62 |
| 211. | 4 | 0.71 |
| 218. | 2 | 0.36 |
| 225. | 1 | 0.18 |
| 233. | 6 | 1.07 |
| 255. | 6 | 1.07 |
| 262. | 4 | 0.71 |
| 270. | 2 | 0.36 |
| 277. | 1 | 0.18 |
| 284. | 1 | 0.18 |
| 306. | 3 | 0.53 |
| 314. | 1 | 0.18 |
| 321. | 1 | 0.18 |
| 329. | 1 | 0.18 |
| 343. | 2 | 0.36 |
| 351. | 1 | 0.18 |

The mass of wax microspheres which is directly formed by the process of this invention, without separating or sorting portions of the mass, is seen to have a two-tier weight distribution.

The following examples illustrate results obtained with micronized wax spheres used to form a sintered body, specifically, a "scoop", for removing powder from a big drum. The wax is a mixture of petroleum microcrystalline wax, fatty acids, petroleum resin, and fillers referred to in the investment casting trade as "pattern wax" having a true density of about 0.9 g/cm$^3$ (obtained from Howmet Corp as HC-382). The scoop is a wax pattern made by sintering in a SLS 125 ModA machine. The laser used was a $CO_2$ laser operating at a power level of about 15 watts. Both the feed (powder bed) and the target area in the SLS machine are heated with radiant heating means to maintain the designated temperatures. The SLS machine forms the sintered article from the wax powder conventionally, but the article formed by the process is unexpectedly denser than one formed from either large wax spheres only, or small wax spheres only.

In the surprisingly dense article, formed by scanning a laser beam over the surface of a bed of wax powder having a two-tier weight distribution, in a preselected cross-sectional area to form a first layer of sintered powder; depositing additional wax powder onto the sintered layer and again scanning the laser beam over the deposited powder to sinter it forming a second layer of sintered powder corresponding to a predetermined second cross-sectional area, so that the first and second layers of sintered powder are joined; and, depositing successive portions of powder onto previously sintered layers and sintering each successive portion to produce the article, the improvement consisting essentially of said article having a higher bulk density than an article identically formed using either a powder of large spheres, or of small spheres from each tier of the wax powder having the two-tier weight distribution.

It will be evident from the data presented in the Table herebelow that the average bed density (that is, that of a bed of bulk untapped powder), of the mixture of the large and small size ranges of microspheres is about the same as the average bed density of each size range. Further, the sintered density of the "scoop" made from the bed is about the same whether only the "large" or the "small" size ranges of microspheres is used. But the sintered density of the mixture of large and small size ranges is significantly higher than for scoops made from either the large or the small size ranges of microspheres.

TABLE 2

| Material | Powder Bed (feed) temp °C. | Target Bed temp °C. | dens. g/cm³ | Sintered density g/cm³ |
|---|---|---|---|---|
| Wax (large spheres)[1] | 15 | 32–36 | 0.4 | 0.6 |
| Wax (small spheres)[2] | 15 | 32–36 | 0.4 | 0.6 |
| Wax (mixture) | 15 | 32–36 | 0.4 | 0.8 |

[1] spheres in the size range from 20μ–105μ
[2] spheres in the size range from 105μ–350μ

Figure 6:
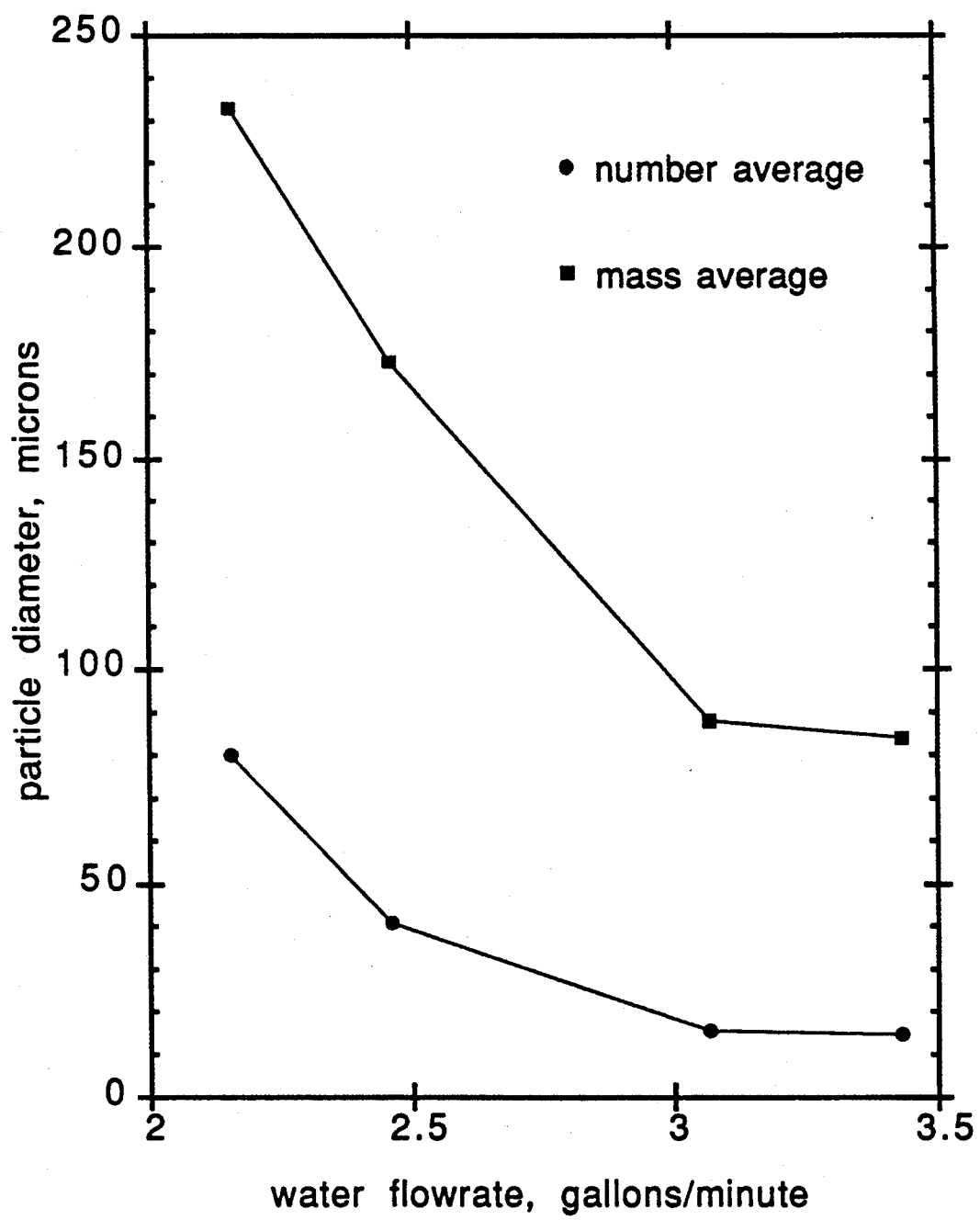
FIG. 6 is a graph in which the rate of flow of water (motive liquid) is plotted against the particle size (number averages are located by circles, mass averages are located by squares) of microspheres produced.
Figure 7:
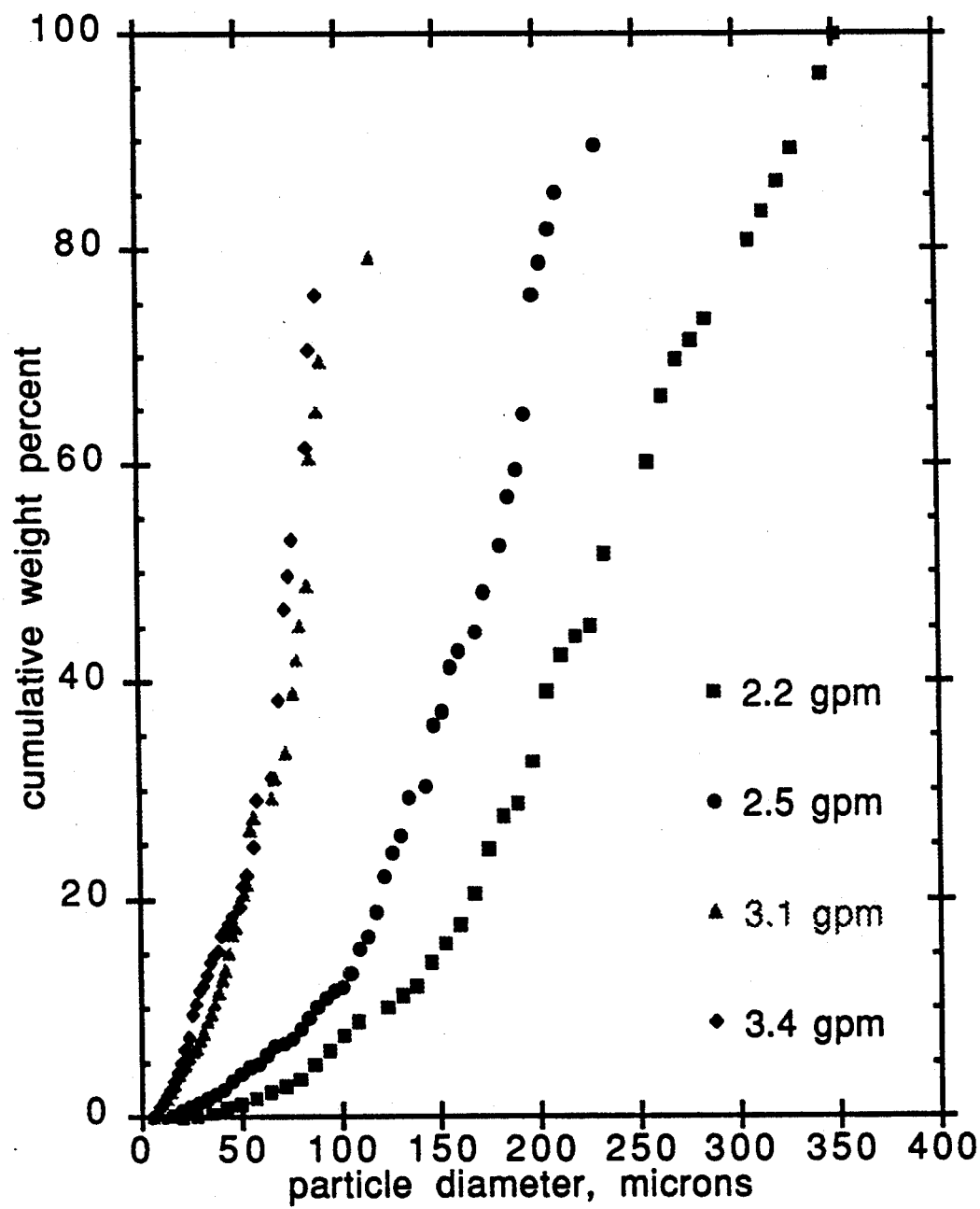
FIG. 7 is a graph in which the particle diameter is plotted against the cumulative weight percent, using four different rates of flow of water through the same size orifice.

The relationship of "number average particle size" and "mass average particle size" for runs made at various flow rates (gpm) through the same orifice, is graphically illustrated in FIG. 6. As might be expected, the particle size obtained is larger when the flow rate is slower, and this is graphically illustrated in FIG. 7. Though the overall particle size range is markedly affected as a function of flow rate through the orifice, note that the cumulative weight percent still shows the two-tier distribution.

Having thus provided a general discussion, described the overall process in detail, and illustrated the invention with specific examples of the best mode of carrying out the process, it will be evident that the invention has provided an effective solution to the specific problem of directly densifying a laser-sintered body as much as possible without melting the entire mass before the sintered body is removed from the SLS machine. It is therefore to be understood that no undue restrictions are to be imposed by reason of the specific embodiments illustrated and discussed, except as provided by the following claims.

We claim:

1. A process for producing wax microspheres from molten wax, comprising,
   (a) flowing a hot motive liquid in which molten wax is immiscible, said motive liquid being flowed at a temperature at least 10° C above the final melting point of the wax, and under pressure in the range from about 300 Kpa to about 2000 Kpa, through an orifice zone into which molten wax is drawn to form a dispersion of molten wax, said pressure being sufficient to generate a pressure drop in said zone to form a dispersion of the molten wax in the hot motive liquid;
   (b) supplying said molten wax to said orifice zone in an amount such that wax is the disperse phase and the hot motive liquid is the continuous phase in the dispersion formed;
   (c) discharging the dispersion into a solidification liquid in which the wax is immiscible, the solidification liquid being maintained at a controlled temperature below the initial melting point of the wax;
   (d) recovering a mass of essentially spherical wax microspheres having a two-tier weight distribution in which more than 50% of the cumulative weight percent of microspheres is attributable to those having a diameter greater than a predetermined diameter; and,
   (e) drying the mass to recover a free-flowing mass of individual wax microspheres.

2. The process of claim 1 wherein the pressure of said motive fluid is in the range from about 500 kPa to about 1000 kPa.

3. The process of claim 2 wherein said wax is selected from the group consisting of paraffins, silicones, natural waxes such as carnauba wax, beeswax, ozocerite and paraffin wax, synthetic waxes such as acid waxes, ester waxes, partly saponified ester waxes, polyethylene waxes, as well as polyglycols.

4. The process of claim 3 wherein said wax melts over a wide range of temperature, the initial melting point being in the range from 3° C. to about 20° C. lower than the final melting point.

5. The process of claim 4 wherein in said two-tier weight distribution, more than half (>50%) the cumulative weight percent is attributable to microspheres having a diameter greater than 175 μ, and substantially all said microspheres are in the size range from 1 μ to about 350 μ.

6. The process of claim 5 wherein the number average diameter of said microspheres produced is in the range from 40 μ to 80 μ.

7. The process of claim 5 wherein the mass average diameter of said microspheres produced is in the range from 170 μ to 240 μ.

* * * * *